United States Patent
Saghir et al.

(10) Patent No.: US 11,310,669 B2
(45) Date of Patent: Apr. 19, 2022

(54) SYSTEMS AND METHODS FOR INTERCEPTING NETWORK TRAFFIC

(71) Applicant: Verizon Patent and Licensing Inc., Arlington, VA (US)

(72) Inventors: Amir Saghir, Frisco, TX (US); Sudhakar Reddy Patil, Westlake, TX (US); William W. Wong, Madison, NJ (US); Rakesh H. Chandwani, Morganville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 331 days.

(21) Appl. No.: 16/546,186

(22) Filed: Aug. 20, 2019

(65) Prior Publication Data
US 2021/0058769 A1    Feb. 25, 2021

(51) Int. Cl.
| | |
|---|---|
| *H04L 29/06* | (2006.01) |
| *H04W 12/80* | (2021.01) |
| *H04W 76/10* | (2018.01) |
| *G06F 16/955* | (2019.01) |
| *H04W 28/16* | (2009.01) |

(52) U.S. Cl.
CPC .......... *H04W 12/80* (2021.01); *G06F 16/955* (2019.01); *H04L 63/20* (2013.01); *H04L 63/302* (2013.01); *H04L 63/304* (2013.01); *H04L 63/306* (2013.01); *H04W 28/16* (2013.01); *H04W 76/10* (2018.02)

(58) Field of Classification Search
CPC .... H04W 76/10; H04W 28/16; H04L 63/302; H04L 63/304; H04L 63/306; H04L 63/20; G06F 16/955
USPC ........................................................ 709/224
See application file for complete search history.

(56) References Cited

U.S. PATENT DOCUMENTS

| | | | |
|---|---|---|---|
| 2012/0039337 A1* | 2/2012 | Jackowski | .......... H04L 43/0894 370/392 |
| 2013/0170348 A1* | 7/2013 | Luna | ................. H04W 28/0215 370/230.1 |
| 2019/0357131 A1* | 11/2019 | Sivavakeesar | ........ H04W 76/19 |

* cited by examiner

*Primary Examiner* — Sibte H Bukhari

(57) ABSTRACT

A system described herein may provide a technique for intercepting user equipment ("UE") traffic based on granular characteristics specified by a law enforcement agency ("LEA") or other authorized requestor. The granular characteristics may indicated a content type, keywords, and/or other characteristics that the requestor may desire to intercept. Traffic attributes, which may be different from the granular characteristics, may be identified based on the granular characteristics. Network components suited to intercepting traffic having the identified attributes may be provisioned to intercept the traffic.

19 Claims, 8 Drawing Sheets

SYSTEMS AND METHODS FOR INTERCEPTING NETWORK TRAFFIC

BACKGROUND

Wireless telecommunication networks provide network connectivity to a variety of user equipment ("UE"), such as mobile telephones or other wireless communication devices. In some situations, a law enforcement agency ("LEA") may, with proper authority, request the wireless telecommunication network provider to intercept traffic associated with a specific UE.

DETAILED DESCRIPTION OF THE PREFERRED EMBODIMENTS

The following detailed description refers to the accompanying drawings. The same reference numbers in different drawings may identify the same or similar elements.

Wireless networks facilitate the communications and transmission of data between various devices and systems, including UEs and content providers. Through the advent of increasing capabilities for traffic flow, relatively large amounts of traffic can be accessed by UEs, such as streaming videos, music, etc. Wireless networks may provide, where permitted by law, access to entities to intercept certain traffic that is sent to and/or received by a particular UE. For instance, LEAs, through the exercise of warrant authority, may require interception of some traffic sent to and/or received by a given UE. While wholesale intercept of data from a UE is possible, it is excessively broad, requires large amounts of memory and network bandwidth, and in most cases is not required. Accordingly, a more targeted and narrowly tailored approach may be needed.

Embodiments described herein may provide for intercept requests that specify traffic parameters, which are more detailed than systems that provide for intercept requests that only specify less granular characteristics of traffic. For example, as described below, "granular characteristics" may be specified by an entity (e.g., a LEA), to define target traffic to be intercepted (e.g., for review by the entity). As discussed herein, granular characteristics may include, for example, application type (e.g., video application, streaming music application, file transfer application, voice call, etc.), source or destination IP address, quality of service ("QoS") levels (e.g., QoS class indicator ("QCI") values, network slice identifiers ("IDs"), plain language descriptors set by the wireless network provider such as "high priority" or "low priority," etc.), keywords included in the traffic or in traffic metadata (e.g., headers of packets, Uniform Resource Identifiers ("URIs"), etc.), or other descriptors of target traffic. When traffic attributes match one or more of the requested granular characteristics, the wireless network provider may provide the corresponding traffic to the requesting entity.

Figure 1:
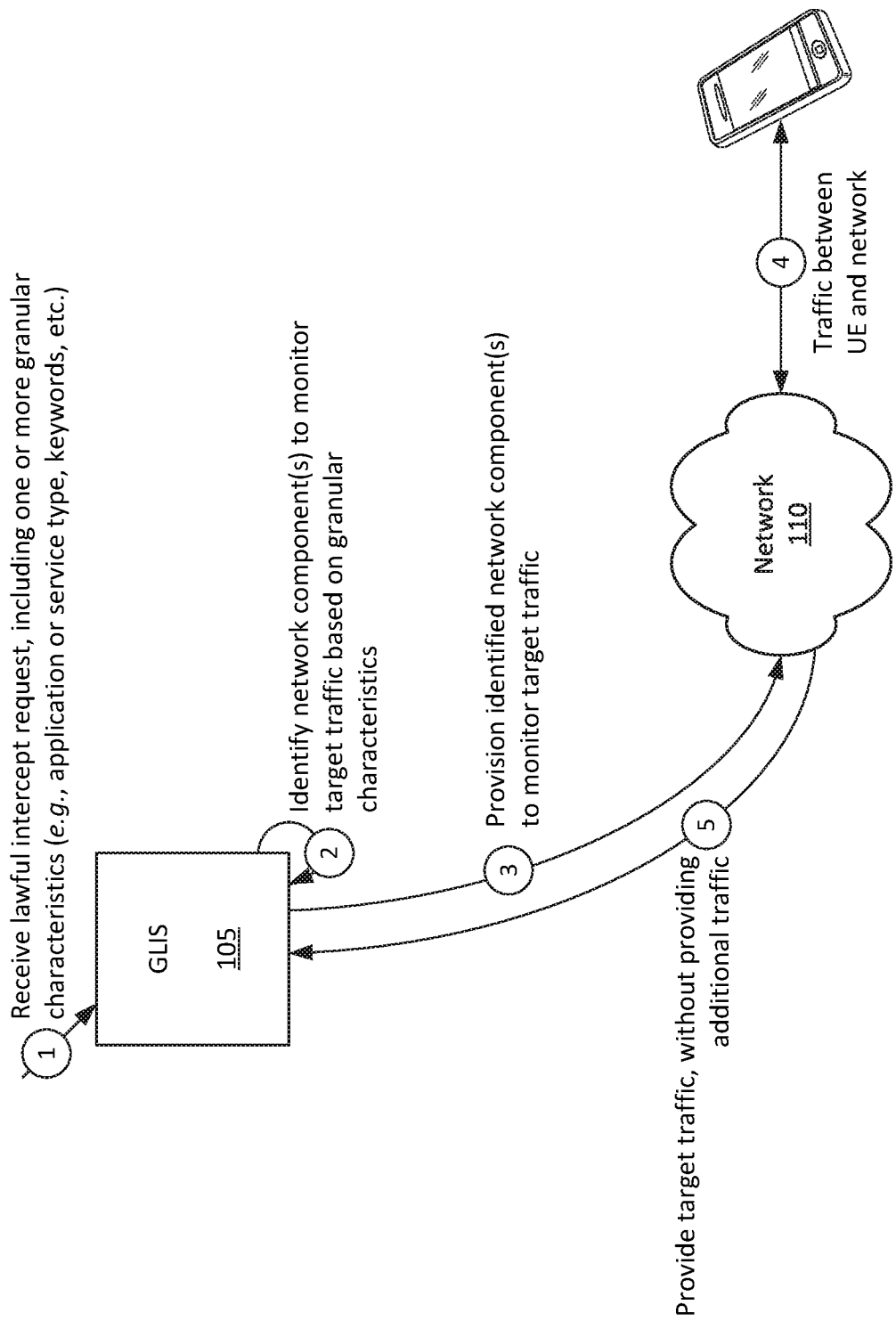
FIG. 1 illustrates an example overview of one or more embodiments described herein, in which a wireless network may intercept particular portions of UE traffic based on granular characteristics (e.g., as requested by a LEA or other authorized entity)

As shown in FIG. 1, for example, Granular Lawful Intercept System ("GLIS") 105 may receive (at 1) an intercept request including one or more requested granular characteristics from a requestor authorized to intercept traffic, such as a LEA and/or other type of entity. The requested granular characteristics may include application type (e.g., video application, file transfer application, voice call, etc.), source or destination IP address, QoS levels, keywords, or other descriptors of target traffic. GLIS 105 may identify (at 2) one or more network components to monitor target traffic based on the requested granular characteristics. In some embodiments, GLIS 105 may be configured to identify which component or components of the wireless network handle traffic that meets the requested granular characteristics. For example, GLIS 105 may determine that a Session Management Function ("SMF") of the wireless network should intercept control plane messages, may determine that a User Plane Function ("UPF") of the wireless network should intercept user plane traffic, etc.

GLIS 105 may provision (at 3) one or more identified network components suited to monitor requested granular characteristics. For example, GLIS 105 may provision the SMF to monitor control plane messages and/or the user plane function UPF to monitor user plane traffic. The provisioned network components may monitor (at 4) traffic between the UE and network 110 in order to identify target traffic that meets the specified granular characteristics.

The provisioned network components monitoring the network traffic between the UE and network 110 may provide (at 5) target traffic, based on the requested granular characteristics, to GLIS 105. The target traffic provided (at 5) to GLIS 105 may be limited to the traffic matching one or more requested granular characteristics, and may not include other traffic that does not match the one or more requested granular characteristics. For example, if the request specified all downstream (e.g., from GLIS 105 to the UE) traffic matching a video application, the provisioned network component(s) would provide (at 5) all downstream traffic whose attributes match the requested granular characteristics (i.e., all downstream traffic which is identifiable as being associated with a video application, but not other downstream traffic, and not upstream video application traffic) to GLIS 105. As another example, if the request specified upstream Short Message Service ("SMS") traffic (e.g., sometimes referred to as "text messages") that includes certain keywords (e.g., "crime," "steal," etc.), the provisioned network component(s) may provide all matching upstream traffic (e.g., text messages that contain the keywords, and/or are sent to recipients who are associated with the keywords) to GUIS 105.

In some embodiments, the provisioned network components monitoring the network traffic between the UE and network may provide (at 5) target traffic categorized, or tagged, by specific granular characteristics. For example, if traffic matches a requested parameter for a video application, the intercepted traffic may be categorized as video application traffic. In some embodiments, traffic may be categorized according to multiple granular characteristics, regardless of requested granular characteristics. For example, if traffic matches a requested granular characteristic for a voice call, the target traffic may be categorized as a voice call (in accordance with the request) and/or other categories with which the traffic is associated, but not necessarily specified in the request (e.g., "low priority," "potential criminal activity," etc.).

Figure 2:
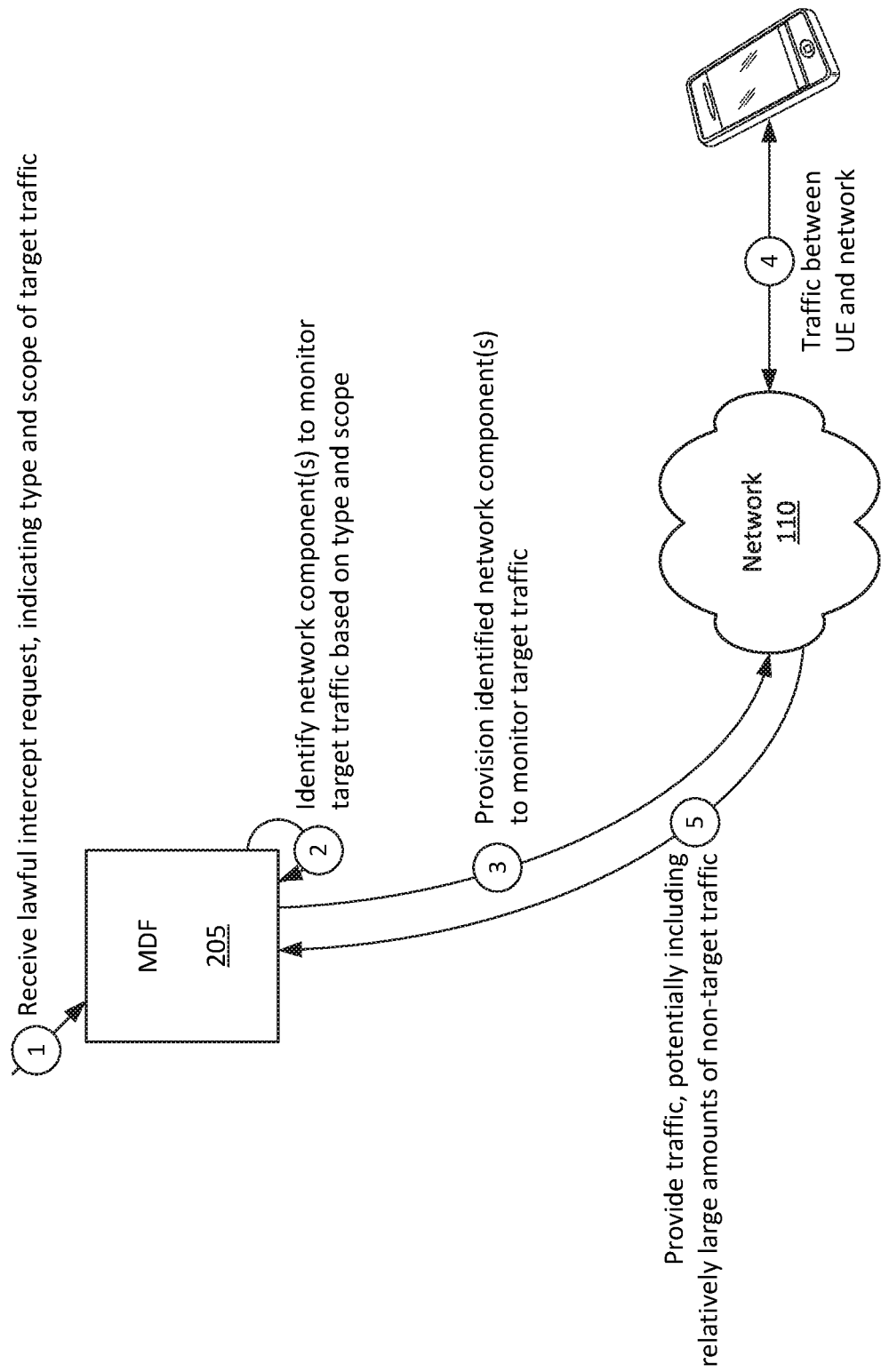
FIG. 2 illustrates an example system in which only limited parameters (e.g., a "type" and a "scope" of traffic) can be specified (e.g., by a LEA) for interception of UE traffic.

FIG. 2 illustrates a sample embodiment wherein a wireless network intercepts UE traffic based on general parameters, such as type and scope. As discussed herein, a "type" of traffic may specify, for example, user plane or control plane traffic. Further, "scope" of traffic may specify, for example, data traffic, voice traffic, messaging traffic, and/or push-to-talk traffic.

As shown, Mediation and Delivery Function ("MDF") 205 may receive (at 1) a lawful intercept request, specifying one or more types and/or scopes of target traffic. MDF 205 may identify (at 2) one or more network components to monitor target data based on the requested types and/or scopes of target traffic. For example, MDF 205 may identify an SMF to intercept control plane messages and a UPF to intercept user plane traffic. MDF 205 may provision (at 3) the identified network component(s) suited to intercept requested types and/or scopes of traffic. The provisioned network component(s) monitor the network traffic sent (at 4) between the UE and network 110.

The provisioned network component(s) monitoring the network traffic between the UE and network 110 may provide (at 5) target traffic, based on the requested types and/or scope of target traffic, to MDF 205. The target traffic provided (at 5) to MDF 205 may be limited to the traffic matching one or more requested types and/or scopes. As discussed above, a request for a type of traffic may identify, for example, user plane and/or control plane traffic, while a request for scope of traffic may identify, for example, data, voice, messaging, and/or push to talk traffic. For example, if scope indicated data, all data might be sent, even if the actual desired target traffic is relatively small (e.g., 12 minutes of video content about how to commit a crime, out of 5 hours total of video content accessed by the UE). That is, while the actual desired traffic may amount to a relatively small amount of traffic, a relatively large amount of traffic may be intercepted in scenarios where only type and scope are able to be specified. In contrast, in the example shown in FIG. 1, embodiments described herein may allow for the relatively small amount of traffic to be specified and intercepted, thus reducing the amount of traffic that needs to be stored and that is presented to, for example, a human operator. Further, intercepting less network traffic, in accordance with embodiments described herein, may reduce the amount of network and/or processing resources used to intercept target traffic.

Figure 3:
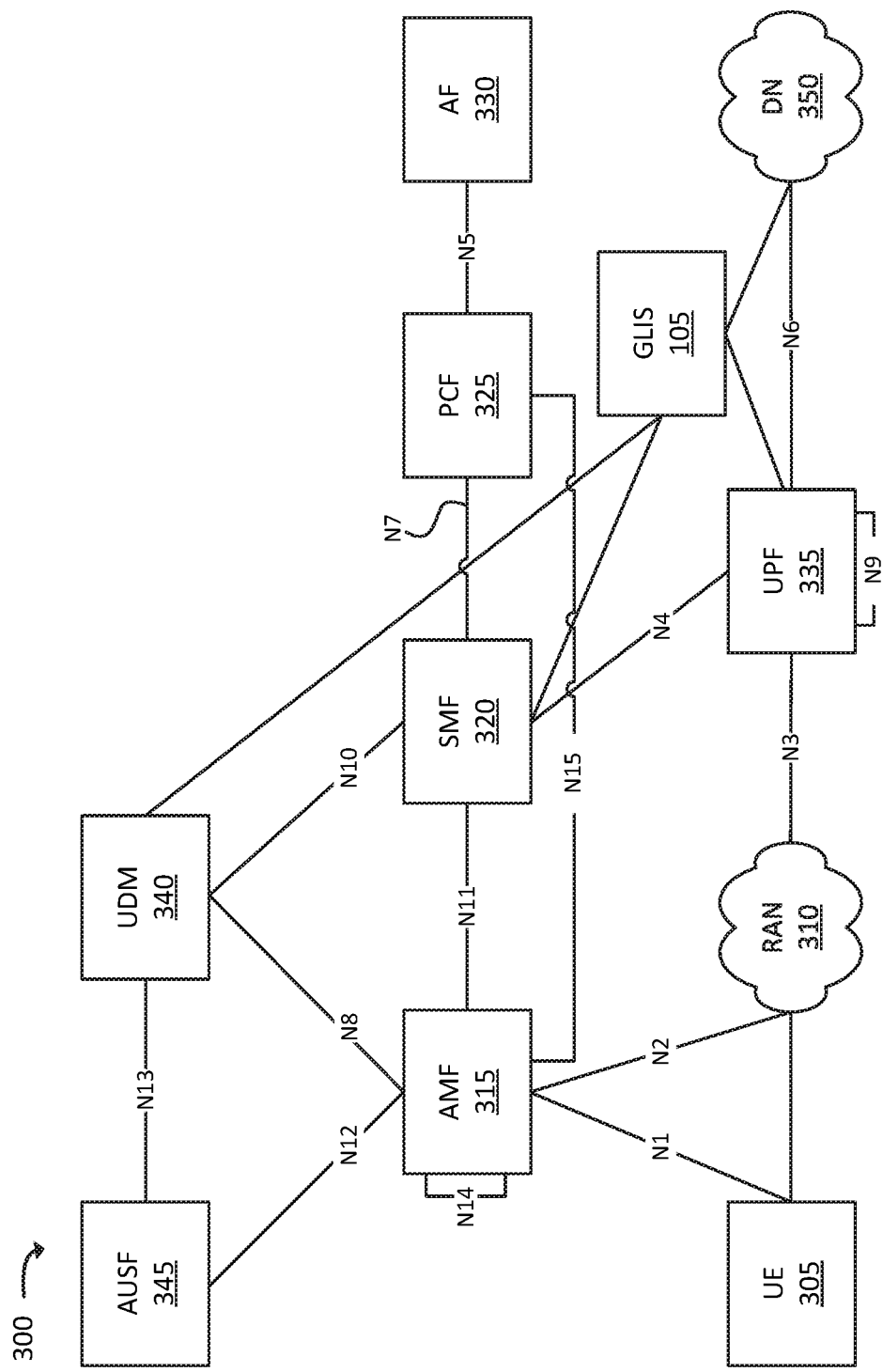
FIG. 3 illustrates an example environment in which one or more embodiments, described herein, may be implemented.

FIG. 3 illustrates an example environment 300 in which one or more embodiments may be implemented. In some embodiments, environment 300 may correspond to a Fifth Generation ("5G") network, and/or may include elements of a 5G network.

FIG. 3 depicts environment 300, which may include GLIS 105, UE 305, Radio Access Network ("RAN") 310, Access and Mobility Management Function ("AMF") 315, SMF 320, Policy Control Function ("PCF") 325, Application Function ("AF") 330, UPF 335, Unified Data Management ("UDM") 340, Authentication Server Function ("AUSF") 345, and Data Network ("DN") 350.

The quantity of devices and/or networks, illustrated in FIG. 3, is provided for explanatory purposes only. In practice, environment 300 may include additional devices and/or networks, fewer devices and/or networks, different devices and/or networks, or differently arranged devices and/or networks than illustrated in FIG. 3. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environment 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300.

GLIS 105 may include one or more devices (e.g., a single device, and/or a collection of devices, such as cloud computing system) that performs one or more functions described herein. For example, GLIS 105 may receive requests for a lawful intercept of traffic associated with UE 305, identify and provision 5G network components capable of intercepting traffic that meets requested types and/or scopes, and cause the provisioned components to store and/or output the intercepted traffic. In some embodiments, GLIS 105 may perform further filtering and/or granular identification of intercepted traffic (e.g., in situations where other components of the wireless network depicted in FIG. 3 are not configurable to, and/or are otherwise not configured to, perform the interception of traffic in a granular manner).

In some embodiments, GLIS 105 may identify and provision network components (e.g., 5G network components) to intercept traffic that meets requested granular characteristic(s) for target traffic. The requested granular characteristic(s) may include application type (e.g., video application, file transfer application, voice call, etc.), source or destination IP address, quality of service levels (e.g., plain language descriptors set by the wireless network provider such as "high priority" or "low priority," etc.), keywords, or other descriptors of target traffic. In some embodiments, GLIS 105 may identify network component(s) capable of intercepting the requested granular characteristic(s).

UE 305 may include a computation and communication device, such as a wireless mobile communication device that is capable of communicating with RAN 310 and/or DN 350. UE 305 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device. UE 305 may send traffic to and/or receive traffic (e.g., user plane traffic) from DN 350 via RAN 310 and UPF 335.

RAN 310 may be, or may include, a 5G RAN that includes one or more base stations, via which UE 305 may communicate with one or more other elements of environment 300. UE 305 may communicate with RAN 310 via an air interface. For instance, RAN 310 may receive traffic (e.g., voice call traffic, data traffic, messaging traffic, signaling traffic, etc.) from UE 305 via the air interface, and may communicate the traffic to UPF 335, and/or one or more other devices or networks. Similarly, RAN 310 may receive traffic intended for UE 305 (e.g., from UPF 335, AMF 315, and/or one or more other devices or networks) and may communicate the traffic to UE 305 via the air interface.

AMF 315 may include one or more computation and communication devices that perform operations to register UE 305 with the 5G network, to establish bearer channels associated with a session with UE 305, to hand off UE 305 from the 5G network to another network, to hand off UE 305 from the other network to the 5G network, and/or to perform other operations. In some embodiments, the 5G network may include multiple AMFs 315, which communicate with each other via the N14 interface (denoted in FIG. 3 by the line marked "N14" originating and terminating at AMF 315).

SMF 320 may include one or more network devices that gather, process, store, and/or provide information in a manner described herein. SMF 320 may, for example, facilitate in the establishment of communication sessions on behalf of UE 305. In some embodiments, the establishment of communications sessions may be performed in accordance with one or more policies provided by PCF 325. In some embodiments, SMF 320 may be provisioned or configured to intercept some or all control messages associated with UE 305 (e.g., based on an intercept request, as received by GLIS 105), and provide the intercepted messages to GLIS 105 and/or some other system or device.

PCF 325 may include one or more devices that aggregate information to and from the 5G network and/or other sources. PCF 325 may receive information regarding policies and/or subscriptions from one or more sources, such as subscriber databases and/or from one or more users (such as, for example, an administrator associated with PCF 325).

AF 330 may include one or more devices, systems, Virtualized Network Functions ("VNFs"), etc., that receive, store, and/or provide information that may be used in determining parameters (e.g., quality of service parameters, charging parameters, or the like) for certain applications.

UPF 335 may include one or more devices, systems, VNFs, etc., that receive, store, and/or provide data (e.g., user plane data). For example, UPF 335 may receive user plane data (e.g., voice call traffic, data traffic, etc.), destined for UE 305, from DN 350, and may forward the user plane data toward UE 305 (e.g., via RAN 310, SMF 320, and/or one or more other devices). In some embodiments, multiple UPFs 335 may be deployed (e.g., in different geographical locations), and the delivery of content to UE 305 may be coordinated via the N9 interface (e.g., as denoted in FIG. 3 by the line marked "N9" originating and terminating at UPF 335). Similarly, UPF 335 may receive traffic from UE 305 (e.g., via RAN 310, SMF 320, and/or one or more other devices), and may forward the traffic toward DN 350. In some embodiments, UPF 335 may communicate (e.g., via the N4 interface) with SMF 320, regarding user plane data processed by UPF 335. In some embodiments, UPF 335 may be provisioned or configured to intercept some or all user plane traffic associated with UE 305 (e.g., based on an intercept request, as received by GLIS 105), and provide the intercepted traffic to GLIS 105 and/or some other system or device.

AUSF 345 and UDM 340 may include one or more devices that manage, update, and/or store, in one or more memory devices associated with AUSF 345 and/or UDM 340, profile information associated with a subscriber. AUSF 345 and/or UDM 340 may perform authentication, authorization, and/or accounting operations associated with the subscriber and/or a communication session with UE 305.

DN 350 may include one or more wired and/or wireless networks. For example, DN 350 may include an Internet Protocol ("IP")-based PDN, a wide area network ("WAN") such as the Internet, a private enterprise network, and/or one or more other networks. UE 305 may communicate, through DN 350, with data servers, other UEs 105, and/or to other servers or applications that are coupled to DN 350. DN 350 may be connected to one or more other networks, such as a public switched telephone network ("PSTN"), a public land mobile network ("PLMN"), and/or another network. DN 350 may be connected to one or more devices, such as content providers, applications, web servers, and/or other devices, with which UE 305 may communicate.

Figure 4:
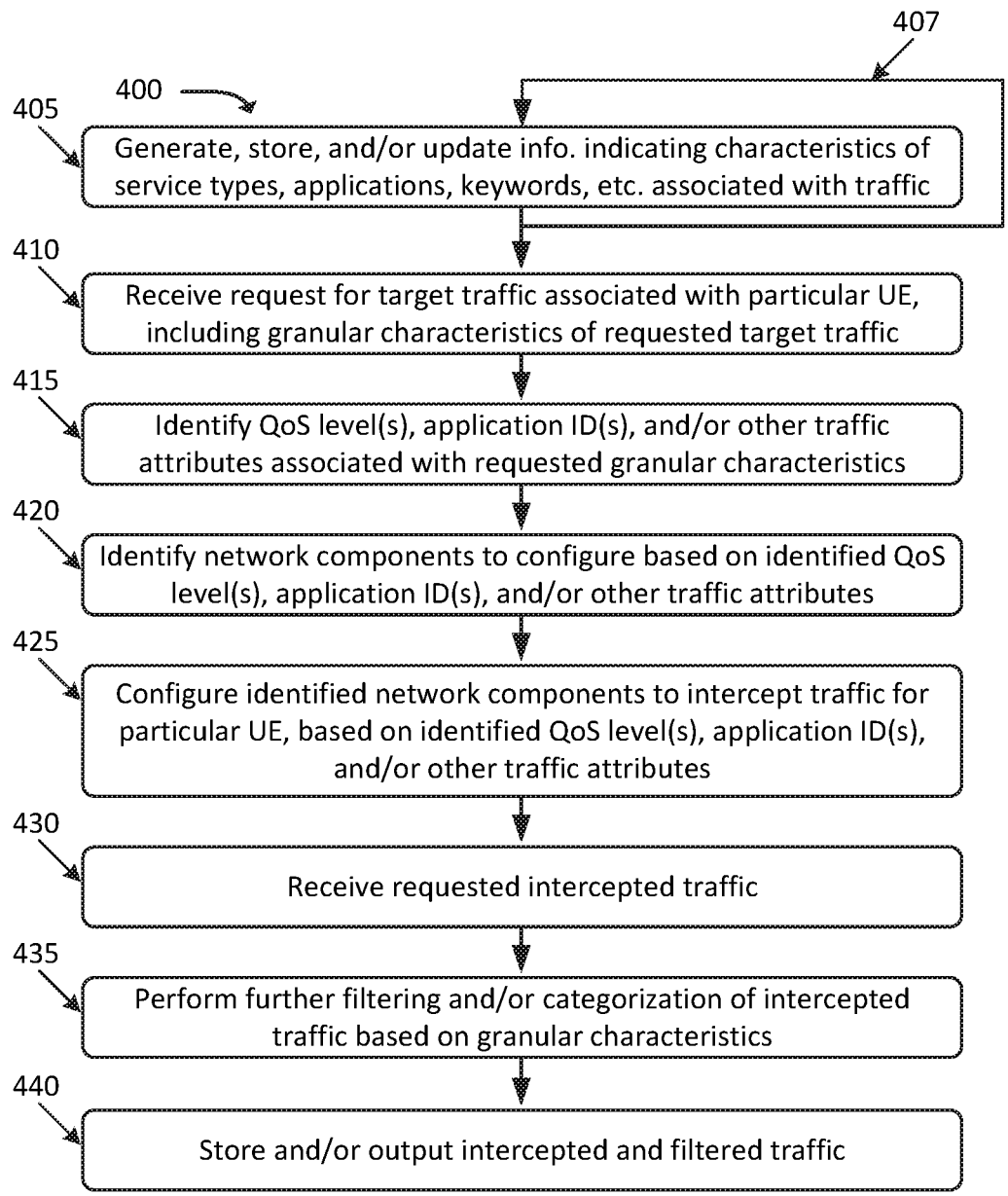
FIG. 4 illustrates an example process for intercepting UE traffic according to granular characteristics, in accordance with some embodiments described herein.

FIG. 4 illustrates a process 400 for intercepting UE traffic according to granular characteristics, in accordance with some embodiments described herein. In some embodiments, some or all of process 400 may be performed by GLIS 105, and/or by one or more other devices or systems.

As shown, process 400 may include, on an ongoing basis, generating, storing, and/or updating (at 405) information indicating characteristics of service types, applications, keywords, and/or other attributes associated with traffic. For instance, GLIS 105 may generate or update a lookup table or some other data structure which may include correlation information that correlates granular characteristics (e.g., which may be specified by a requestor of an intercept request) to attributes or other characteristics of traffic, which may aid in the interception of traffic that meets the granular characteristics. The correlation information may indicate network components that handle traffic using certain granular characteristics. For example, the correlation information may indicate that one or more network components, such as AMF 315 and SMF 320, are associated with granular characteristics related to control plane messages (e.g., a granular characteristic that specifies control plane messages, includes the keywords "control message," "call set-up," "handover," or other similar characteristics). Further, the correlation information may indicate that one or more network components, such as UPF 335, are associated with granular characteristics related to user plane traffic (e.g., a granular characteristic that specifies user plane traffic, includes the keywords "user plane," or other similar characteristics).

The correlation information may indicate certain QoS levels that are associated with certain granular characteristics. As referred to herein, a "QoS level" may refer to an indicator (e.g., a network slice ID, QCI, and/or other indicator of priority of traffic) that may be used by a network in determining how to prioritize or otherwise treat the traffic. The QoS level may be indicated by a value, present in traffic, that is unencrypted and/or is otherwise readable by GLIS 105.

For instance, the correlation information may indicate that the keywords "video," "watch," words that match a title of a known video (e.g., the title of a popular video on a video sharing site), etc., are associated with a QoS level that is associated with, or is typically associated with, video delivery via the network (e.g., a relatively high throughput QoS level with loose or no guarantees of latency). As another example, the correlation information may indicate that the keywords "call" or "talk" are associated with a QoS level that is associated with, or is typically associated with voice calls via the network (e.g., a QoS level with relatively low throughput guarantees, relatively low latency, and relatively low packet/data loss). As yet another example, the correlation information may indicate that the keywords "download" or "upload" are associated with a QoS level that is associated with, or is typically associated with, file transfers via the network (e.g., a relatively low QoS level).

As another example, the correlation information may indicate application IDs that are associated with certain granular characteristics. The application ID may be indicated by a value, present in traffic, that is unencrypted and/or is otherwise readable by GLIS 105.

For example, the correlation information may indicate that an example granular characteristic that includes the keyword "App_A" (e.g., where "App_A" is the name of an application, or "app," that may be available for installation at a UE) may be associated with an application ID of an application that has the name "App_A." As another example, the correlation information may indicate that the example granular characteristic that includes the keywords "video," "watch," etc. may be associated with one or more application IDs of applications that are associated with the delivery of video content.

While examples are given above of granular characteristics that may be associated with attributes of traffic, in practice, different examples are possible, including correlations between seemingly unrelated granular characteristics and attributes of traffic. For example, granular characteristics that include the keywords "how to commit crime" may be indicated, in the correlation information, as being associated with video traffic (e.g., traffic having a QoS level that is associated with video content, traffic having an application ID that is associated with video content, traffic that is handled by network components that typically handle user plane video traffic, etc.). This correlation may be generated (e.g., by GLIS 105) using, for example, machine learning techniques (e.g., reinforced or unreinforced machine learning, classification, clustering, neural nets, and/or other machine learning techniques). For instance, GLIS 105 may determine, based on analysis of traffic and/or based on other techniques, that the phrase "how to commit crime" is more likely to be present in video content than in other types of traffic.

As denoted in FIG. 4 by arrow 407, block 405 may be performed in an ongoing process. For example, by continuously updating the correlation information (e.g., based on machine learning techniques and/or other suitable techniques), the correlation information may be refined such that inaccurate correlation information is corrected, new correlations may be identified, affinity scores of correlations (e.g., scores that indicate how likely a given granular characteristic is associated with a given traffic attribute) may be increased or decreased, etc.

Process 400 may also include receiving (at 410) a request for target traffic associated with a particular UE, including granular characteristics of the requested target traffic. As discussed herein, "target traffic" is traffic that may be of interest to an intercept requestor, based on granular characteristics provided by the requestor. The request for traffic associated with a particular UE may be received from a LEA or other requestor authorized to request such information. The granular characteristics of requested target traffic may include application type (e.g., video application, file transfer application, voice call, etc.), source or destination IP address, quality of service levels (e.g., plain language descriptors set by the wireless network provider such as "high priority" or "low priority," etc.), keywords, or other descriptors of the target traffic.

Process 400 may also include identifying one or more (at 415) QoS levels, application IDs, and/or other traffic attributes associated with the requested granular characteristics. As mentioned above, QoS levels (e.g., slice IDs, QCI values, etc.) and/or application IDs may be present at the application and/or TCP layer and may be unencrypted or are otherwise readable by GLIS 105 and/or other devices and systems. GLIS 105 may use the correlation information (e.g., as discussed above with respect to block 405) to determine QoS levels, application ID(s), and/or other traffic attributes that would match the requested granular characteristics. For example, GLIS 105 may identify, when the requested granular parameters specify parameters associated with video delivery (e.g., a title of a video, a URI that indicates a video website, the word "video," etc.), an application ID associated with one or more applications, websites, service providers, etc. that deliver video content. Similarly, if the granular characteristics specify a throughput of 2 MB/s (e.g., a throughput that may be associated with video content delivery), GLIS 105 may identify that the request is associated with video content, and may identify (e.g., based on the correlation information discussed above) one or more application IDs associated with video content delivery.

Process 400 may further include identifying (at 420) network component(s) to configure based on the identified QoS level(s), application ID(s), and/or other traffic attributes. In some embodiments, GLIS 105 may identify one or more network components by comparing the traffic attributes (e.g., QoS levels, application ID(s), etc.) to network component(s) suited to handle such attributes. For example, GLIS 105 may identify, based on the generated data structure, SMF 320 to monitor control plane messages and UPF 335 to monitor user plane traffic. Additionally, or alternatively, GLIS 105 may identify network components based on correlation information discussed above. For example, the QoS levels, application IDs, and/or other traffic attributes may correlated with one or more network components. As discussed above, multiple network components may be able to monitor multiple types of traffic and multiple granular characteristics may be associated with multiple network components.

Process 400 may include configuring (at 425) the identified network components to intercept traffic for particular UE, based on QoS level(s), application ID(s), and/or other traffic attributes. For example, GLIS 105 may instruct, and/or otherwise cause, the network components (identified at 420) to intercept traffic, for the particular UE, that matches the identified QoS levels and/or application IDs associated with the requested granular parameters.

Process 400 may include receiving (at 430) the requested intercepted traffic. For example, configured network components may transmit all requested intercepted traffic (e.g., traffic that has attributes, such as QoS level and/or application ID, that are associated with requested granular characteristics) to GLIS 105.

Process 400 may additionally include performing (at 435) further filtering and/or categorization of the intercepted traffic based on the granular characteristics. For example, GLIS 105 may evaluate header information and/or may perform deep packet inspection ("DPI") to identify traffic, that has already been identified as including (or potentially including) target traffic, in a more specific manner. For instance, assume that a particular intercept request specifies the keywords, "videos about crime." While traffic that includes application IDs that match video delivery content may have been intercepted and received (at 430) by GLIS 105, this traffic may still include videos that are not related to the keyword "crime." GLIS 105 may filter the traffic by, for example, identifying header information in the traffic that includes the word "crime" (e.g., a URI included in an IP header, where the URI includes the word "crime" (e.g., where the URI includes or is associated with a Uniform Resource Locator ("URL") that includes the word "crime")). Additionally, or alternatively, GLIS 105 may identify, in the header information (and/or in other portions of the traffic, which may be identified using DPI or other suitable techniques), a source of the video that is associated with the word "crime" (e.g., the URI may include a domain name that has been previously associated with the word "crime," such as a domain name that commonly provides videos related to crime).

GLIS 105 may, in some embodiments, categorize the intercepted traffic based on granular characteristics for easier sorting or presentation. For example, GLIS 105 may categorize (1) an intercepted video, that matches an example granular characteristic that specifies "crime" (e.g., has the word "crime" in the title of the video, is from a source that has been previously identified as being associated with crime videos, etc.) and (2) a text message that matches the granular characteristic (e.g., includes the word "crime" in a body of the text message, is sent to or received from an individual or system that has been previously identified as being associated with crime, etc.) in a category of "crime-related content." In this manner, it may be easier to quickly ascertain what granular characteristics have been identified with respect to which intercepted traffic.

In some embodiments, one or more devices or systems may perform this filtering and/or categorization (e.g., in addition to, or in lieu of, GLIS 105). For instance, one or more the network components (configured at 425) may be configured to further analyze headers of traffic and/or perform DPI on traffic to identify the specified granular characteristics, prior to providing the intercepted traffic to GLIS 105.

Process 400 may include storing and/or outputting (at 440) the intercepted traffic. For example, GLIS 105 may provide the intercepted traffic (e.g., as received and/or filtered/categorized at 430 and 435) to the requestor. In some embodiments, GLIS 105 may store the intercepted traffic until such time as the requestor (and/or some other entity) requests or otherwise accesses the intercepted traffic.

Figure 5A:
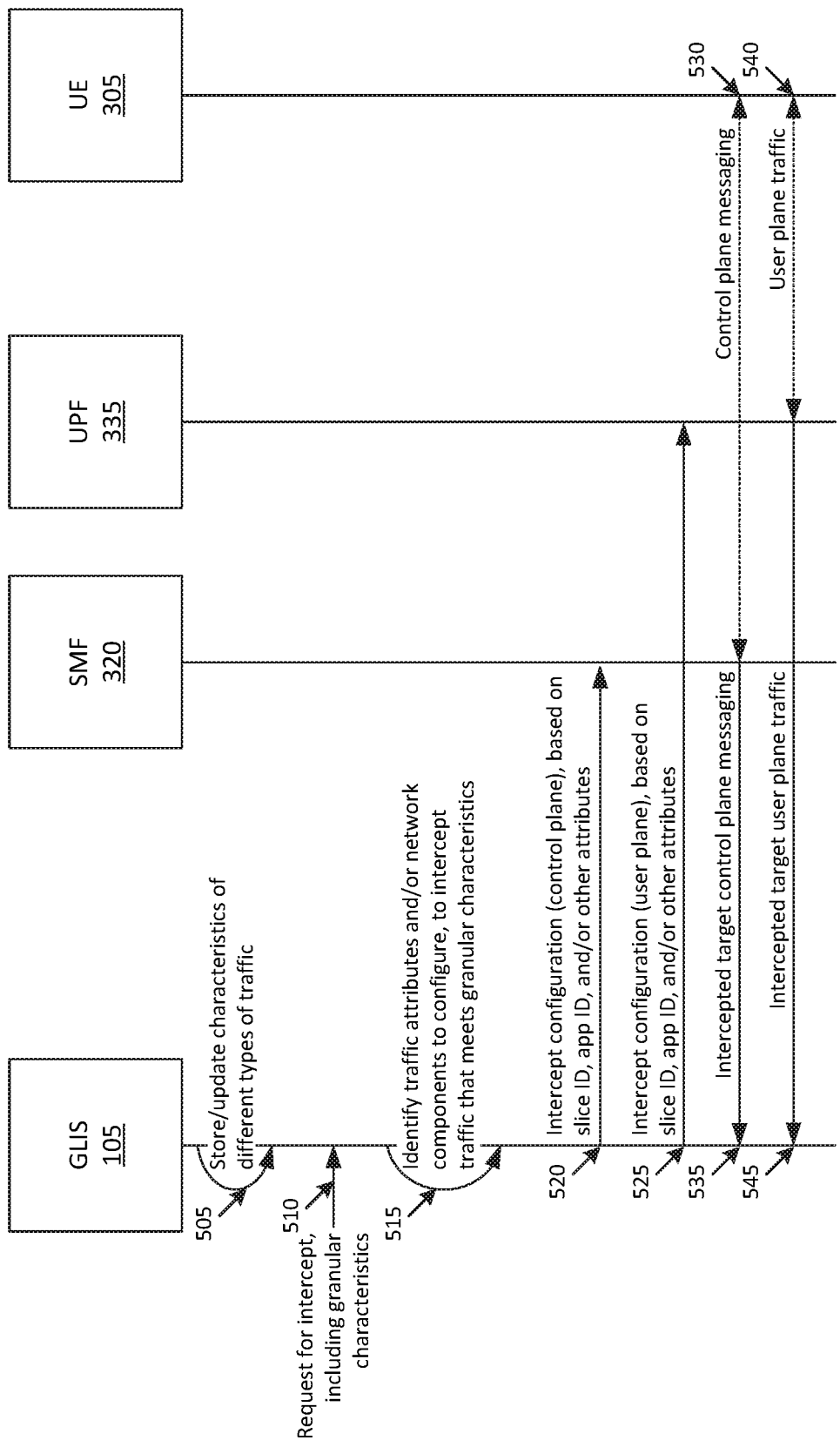
FIGS. 5A and 5B illustrate example signal flows between different components of a wireless network, in order to facilitate the interception of UE traffic on a granular basis.

FIG. 5A illustrates an example call flow for intercepting UE traffic according to granular characteristics, in accordance with some embodiments described herein. The call flow describes how, in some embodiments, the network components communicate to perform provisioned tasks.

As show in FIG. 5A, GLIS 105 may, on an ongoing basis, generate, store, and/or update (at 505) information indicating characteristics of service types, applications, keywords, and/or other attributes associated with traffic. For example, as described herein, GLIS 105 may use machine learning and/or similar techniques to generate or refine correlation information that correlates granular characteristics (e.g., which may be specified by a requestor of an intercept request) to attributes or other characteristics of traffic, which may aid in the interception of traffic that meets the granular characteristics. As discussed above, the correlation information may, for example, indicate certain QoS levels that are associated with certain granular characteristics. As another example, the correlation information may indicate network components that handle traffic that matches certain granular characteristics. For example, the correlation information may indicate that one or more network components, such as AMF 315 and SMF 320, are associated with granular characteristics related to control plane messages (e.g., a granular characteristic that specifies control plane messages, includes the keywords "control message," "call set-up," "handover," or other similar characteristics). Further, the correlation information may indicate that one or more network components, such as UPF 335, are associated with granular characteristics related to user plane traffic (e.g., a granular characteristic that specifies user plane traffic, includes the keywords "user plane," or other similar characteristics).

As shown in FIG. 5A, GLIS 105 may receive (at 510) a request for target traffic associated with a particular UE, including granular characteristics of the requested target traffic. As discussed herein, "target traffic" is traffic that may be of interest to an intercept requestor, based on granular characteristics provided by the requestor. The request for traffic associated with a particular UE may be received from a LEA or other requestor authorized to request such information. The granular characteristics of requested target traffic may include application type (e.g., video application, file transfer application, voice call, etc.), source IP address (e.g., a particular website that hosts content, such as video content, audio content, e-books, etc.), destination IP address, QoS levels (e.g., plain language descriptors set by the wireless network provider such as "high priority" or "low priority," etc.), keywords, or other descriptors of the target traffic.

GLIS 105 may identify (at 515) one or more traffic attributes associated with requested granular characteristics and one or more correlated network components. GLIS 105 may use the correlation information (e.g., as discussed above with respect to arrow 505) to determine QoS levels, application ID(s), and/or other traffic attributes that would match the requested granular characteristics. As described above, traffic attributes may include one or more QoS levels, application IDs, and/or other traffic attributes associated with the requested granular characteristics (e.g., which may be identified in headers of the traffic and/or by performing DPI on the traffic). As described herein, QoS levels (e.g., slice IDs, QCI values, etc.) and/or application IDs may be present at the application and/or TCP layer and may be unencrypted or are otherwise readable by GLIS 105 and/or other devices and systems. GLIS 105 may use the correlation information to determine QoS levels, application ID(s), and/or other traffic attributes that would match the requested granular characteristics.

Furthermore, GLIS 105 may identify (at 515) network components to configure based on the identified QoS level(s), application ID(s), and/or other traffic attributes. In some embodiments, GLIS 105 may identify one or more network components by comparing the traffic attributes (e.g., QoS levels, application ID(s), etc.) to network component(s) suited to handle such attributes. For example, GLIS 105 may identify, based on the generated data structure, SMF 320 to monitor control plane messages and UPF 335 to monitor user plane traffic. Additionally, or alternatively, GLIS 105 may identify network components based on correlation information (e.g., as discussed above with respect to arrow 505). As discussed above, multiple network components may be able to monitor multiple types of traffic and multiple granular characteristics may be associated with multiple network components.

GLIS 105 may configure (at 520) SMF 320 to intercept control plane traffic for particular UE, based on QoS level(s), application ID(s), and/or other traffic attributes. For example, GLIS 105 may instruct, and/or otherwise cause, the network components (identified at 515) to intercept traffic, for the particular UE, that matches the identified QoS levels and/or application IDs associated with the requested granular parameters.

GLIS 105 may configure (at 525) UPF 335 to intercept user plane traffic for particular UE, based on QoS level(s), application ID(s), and/or other traffic attributes. For example, GLIS 105 may instruct, and/or otherwise cause, the network components (identified at 515) to intercept traffic, for the particular UE, that matches the identified QoS levels and/or application IDs associated with the requested granular parameters. In some embodiments (e.g., as described below with respect to FIG. 5B), GLIS may configure UPF 335 by sending a command, instructions, and/or other information to SMF 320, indicating the configuration of UPF 335. In turn, SMF 320 may (e.g., via the N4 interface), instruct UPF 335 to intercept user plane traffic for the particular UE, in accordance with the identified QoS level(s), application ID(s), and/or other traffic attributes.

UE 305 may receive (at 530) control plane messaging traffic matching one or more requested granular characteristics. UPF 335 may provide (at 535) intercepted target control plane messaging to GLIS 105. Target traffic is determined by comparing the requested granular characteristics to the associated traffic attributes.

GLIS 105 may, upon receiving (at 535) intercepted control plane traffic, further filter and/or categorize intercepted traffic based on granular characteristics. GLIS 105 may also, as part of receiving (at 535) intercepted control plane traffic, store and/or output intercepted control plane traffic. For example, GLIS 105 may provide the intercepted control plane traffic (e.g., as received and/or filtered/categorized at 535) to the requestor. In some embodiments, GLIS 105 may store the intercepted traffic until such time as the requestor (and/or some other entity) requests or otherwise accesses the intercepted traffic.

UE 305 may receive (at 530) user plane traffic matching one or more requested granular characteristics. SMF 320 may provide (at 545) intercepted target control plane messaging to GLIS 105. Target traffic is determined by comparing the requested granular characteristics to the associated traffic attributes.

GLIS 105 may, upon receiving (at 545) intercepted user plane traffic, further filter and/or categorize intercepted traffic based on granular characteristics. GLIS 105 may also, as part of receiving (at 545) intercepted control plane traffic, store and/or output intercepted control plane traffic. For example, GLIS 105 may provide the intercepted control plane traffic (e.g., as received and/or filtered/categorized at 545) to the requestor. In some embodiments, GLIS 105 may store the intercepted traffic until such time as the requestor (and/or some other entity) requests or otherwise accesses the intercepted traffic.

Figure 5B:
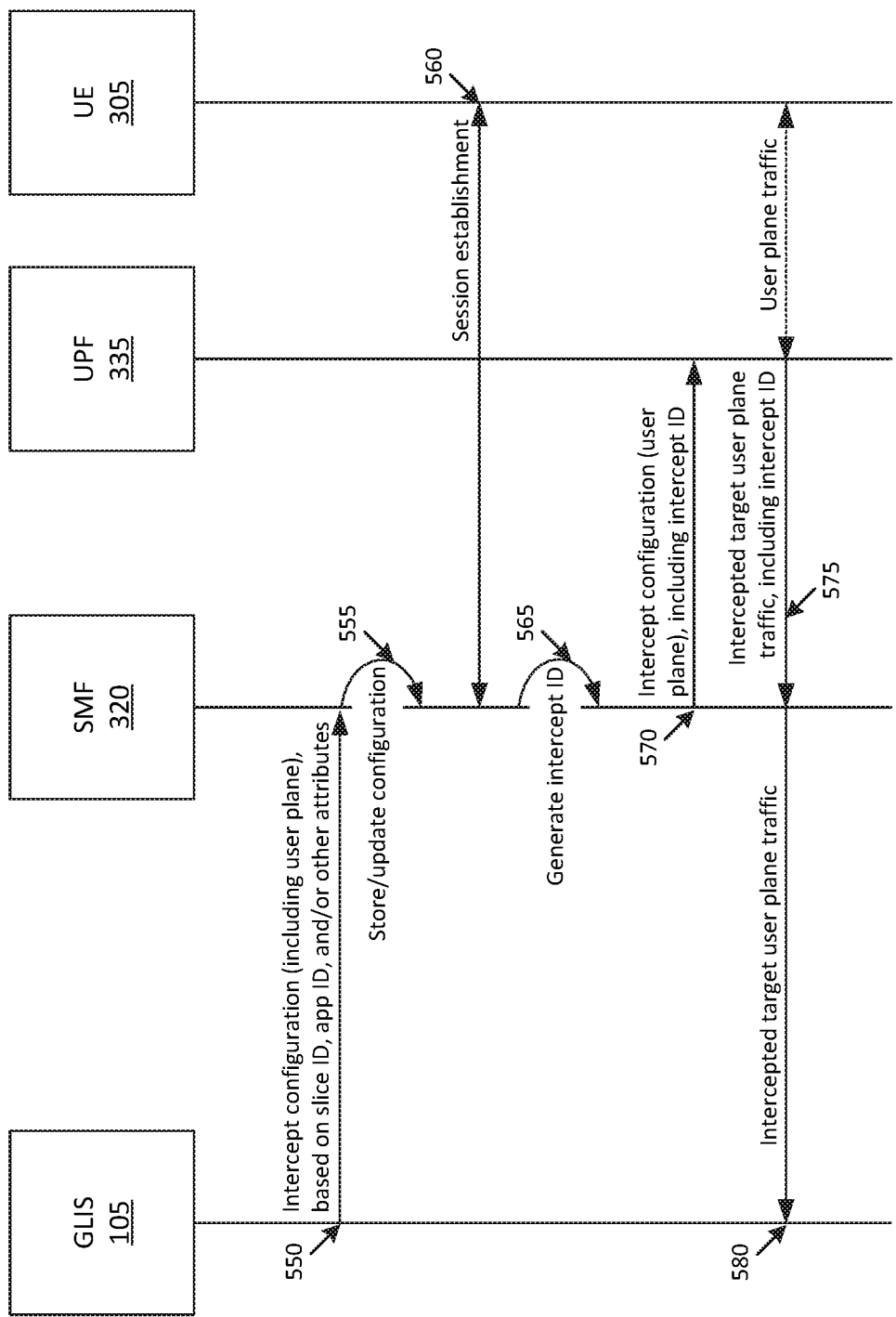

FIG. 5B illustrates an example signal flow in which GLIS 105 provides intercept configuration information to SMF 320 (including a configuration where the target traffic is, or includes, user plane traffic), and where SMF 320 configures UPF 335 to intercept the target traffic. For instance, GLIS 105 may receive (e.g., similar to arrow 510 of FIG. 5A) an intercept request, and may identify attributes and/or network components to configure (e.g., similar to arrow 510 of FIG. 5B). Assume, for this example, that GLIS 105 has identified that the target traffic includes user plane traffic (e.g., traffic handled by UPF 335). GLIS 105 may provide (at 550) intercept configuration information to SMF 320, including information identifying attributes of the target user plane traffic (e.g., slice ID, application ID, etc.). SMF 320 may store (at 555) the configuration information, and/or may update existing configuration information (e.g., previously received intercept configuration information). For example, SMF 320 may store the configuration information while UE 305 is "inactive" (e.g., is not sending and/or receiving traffic, does not have an active session with the network, is powered off, etc.).

SMF 320 may determine (at 560) that a session (e.g., a Protocol Data Unit ("PDU") session and/or some other type of session or communication) has been established between the network and UE 305. Based on detecting the session establishment, SMF 320 may generate (at 565) an intercept ID, which may be used to identify traffic that has been intercepted in accordance with the intercept request. In some embodiments, the intercept ID may be a randomly generated number or character string. In some embodiments, the intercept ID may be, or may include, a cryptographic hash (and/or some other function) of an identifier of UE 305 (e.g., of an MDN of UE 305, of an IMSI or IMEI of UE 305, etc.). SMF 320 may, in some embodiments, store information correlating UE 305 to the intercept ID. Additionally, or alternatively, SMF 320 may, in some embodiments, store information correlating a requestor, associated with the intercept request, to the intercept ID.

Further, based on detecting the session establishment, SMF 320 may provide (at 570) the intercept configuration to UPF 335, based on which UPF 335 may monitor and intercept (at 575) user plane traffic based on the configuration. UPF 335 may, in some embodiments, add the intercept ID when providing (at 575) the traffic to SMF 320. For instance, UPF 335 may add the intercept ID to header information of the traffic before providing the traffic to SMF 320, and/or may add a new header with the intercept ID. SMF 320 may, in some embodiments, use the intercept ID to identify that the traffic received from UPF 335 is associated with UE 305, and/or is associated with the requestor of the intercept request. SMF 320 may provide (at 580) the intercepted target user plane traffic to GLIS 105. In some embodiments, SMF 320 may remove the intercept ID prior to providing the intercepted traffic to GLIS 105. In some embodiments, instead of UPF 335 providing the target traffic to SMF 320, UPF 335 may provide the target traffic to GLIS 105 without sending the traffic to SMF 320 (e.g., via a communication pathway that does not include SMF 320).

In some embodiments, SMF 320 may detect (not shown) that UE 305 has become inactive. For instance, the communication session(s) between the network and UE 305 may be torn down, UE 305 may stop sending and/or receiving traffic, UE 305 may power down, etc. When SMF 320 detects that UE 305 has become inactive, SMF 320 may notify UPF 335 that UPF 335 does not need to store the configuration information any more, at which point UPF 335 may flush the configuration information (e.g., free up memory, processing, and/or storage resources that were used to monitor and/or intercept traffic based on the configuration). SMF 320 may maintain the configuration information until such time as UE 305 becomes active again, at which point SMF 320 may again detect (at 560) a session establishment, and provide (at 570) the intercept configuration to UPF 335. In some embodiments, SMF 320 may generate a new intercept ID.

In some embodiments, GLIS 105 may generate an intercept ID and provide the intercept ID to SMF 320 and/or UPF 335. In such embodiments, SMF 320 and/or UPF 335 may add the intercept ID to intercepted traffic prior to providing the intercepted traffic to GLIS 105, so that GLIS 105 may identify UE 305 and/or the requestor associated with the intercepted traffic.

Figure 6:
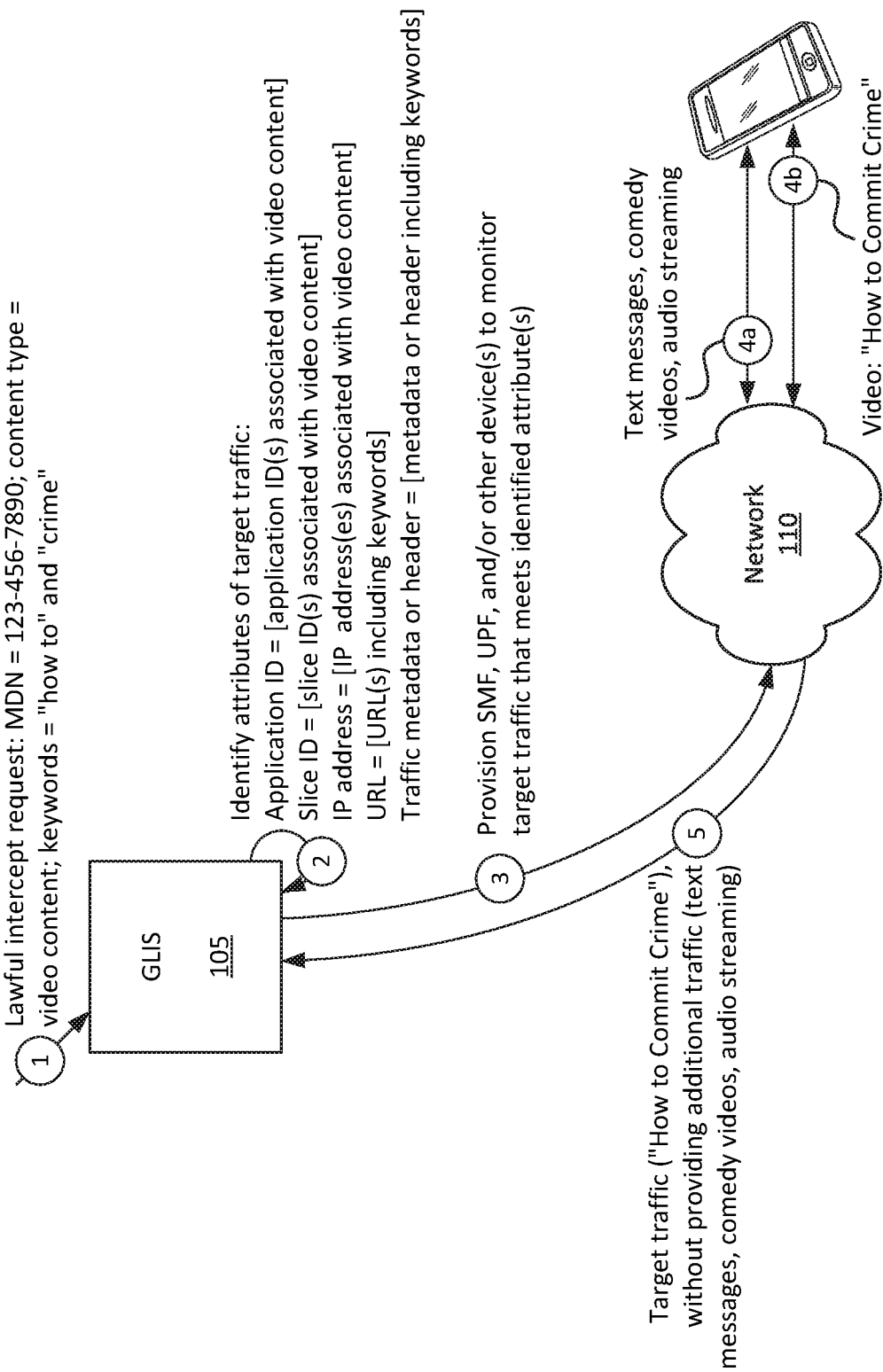
FIG. 6 illustrates an example of network intercept of UE traffic based on granular characteristics, in accordance with some embodiments described herein.

FIG. 6 illustrates an example request of an interception of target traffic based on an intercept request that specifies granular parameters. GLIS 105 may receive (at 1) an intercept request for traffic associated with a particular UE (e.g., a UE having the mobile directory number ("MDN") 123-456-7890), which requests video content with keywords "how to" and "crime." GLIS 105 may identify (at 2) attributes of target traffic. For example, GLIS 105 may identify application ID(s), slice ID(s), and/or IP addresses associated with video content. In this example, GLIS 105 may also identify one or more IP addresses and/or URIs that are associated with video content and/or are associated with one or more keywords included in the intercept request. GLIS 105 may also identify that metadata or headers that include one or more the requested keywords are target traffic. GLIS 105 may provision SMF 320, UPF 335, and/or other device(s) to monitor traffic, associated with the particular UE, in order to intercept target traffic that meets identified attributes. As discussed above, GLIS 105 may identify appropriate network devices based on a previously updated or created lookup table or other data structure which maps granular characteristics to network components.

Network 110 may transmit (at 4a and 4b) a variety of traffic with the target UE. For example, the UE may send and/or receive (at 4a) text messages, may receive comedy videos, and may receive audio content (e.g., via streaming service). The UE may also receive (at 4b) a video titled "How to Commit Crime." The provisioned network component(s) may identify target traffic associated with the requested granular characteristics (e.g., the video (received at 4b) may match an application ID that matches video applications, a QoS level (e.g., slice ID in this example) that matches video content, a source IP address that has been previously identified as being an IP address from which videos (or crime videos) are provided, and/or header or metadata information that includes the word "crime"). As discussed above, the provisioned network components may be configured to determine only some of the granular characteristics (e.g., application ID and slice ID) in some embodiments, where GLIS 105 may later identify other granular characteristics (e.g., IP address, metadata, etc.) after receiving the traffic (which matches the application ID and/or slice ID) from the configured network components. In some embodiments, the provisioned network components may be configured to determine all of the granular characteristics specified in the intercept request. The provisioned network components may provide (at 5) the intercepted target traffic (e.g., where GLIS 105 may perform further filtering, as discussed above).

Figure 7:
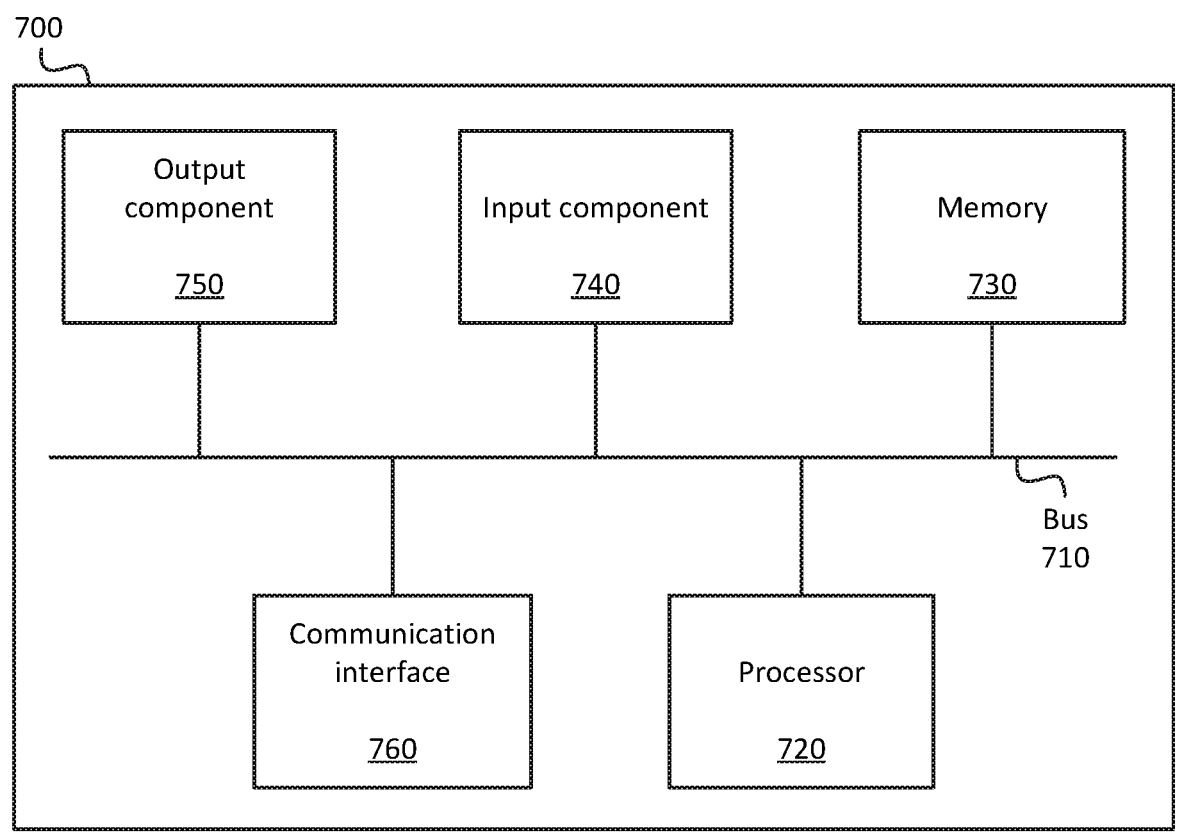
FIG. 7 illustrates example functional components of one or more devices, in accordance with one or more embodiments described herein.

FIG. 7 illustrates example components of device 700. One or more of the devices described above may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 1 and 4-6, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   a non-transitory computer-readable medium storing a set of processor-executable instructions; and
   one or more processors configured to execute the set of processor-executable instructions, wherein executing the set of processor-executable instructions causes the one or more processors to:
   maintain correlation information indicating respective correlations between a plurality of keywords and a plurality of traffic attributes;
   receive, from one or more requesting devices, a request to intercept target traffic, sent via a wireless network, associated with a particular user equipment ("UE"), the request including a particular set of keywords;
   identify, based on the correlation information, a particular set of traffic attributes, of the plurality of traffic attributes, that are correlated to the particular set of keywords included in the request, wherein the particular set of traffic attributes includes a particular network slice;
   select one or more network components, out of a plurality of network components of the wireless network, that handle traffic that meets the particular set of traffic attributes, wherein selecting the one or more network components includes selecting one or more network components associated with the particular network slice;
   configure the selected one or more network components associated with the particular network slice to intercept target traffic, associated with the UE, that meets the particular set of traffic attributes; and
   receive, from the one or more network components, the intercepted target traffic associated with the UE, wherein the intercepted target traffic has been intercepted by the one or more network components based on the particular set of traffic attributes, the intercepted target traffic being a subset of traffic associated with the UE.

2. The device of claim 1,
   wherein executing the processor-executable instructions to identify the one or more traffic attributes further causes the one or more processors to identify whether the particular set of keywords are associated with control plane traffic or with user plane traffic, and
   wherein executing the processor-executable instructions to select the one or more network components includes:
   selecting a first network component that handles control plane traffic when the particular set of keywords are associated with control plane traffic, and
   selecting a second network component that handles user plane traffic when the particular set of keywords are associated with user plane traffic.

3. The device of claim 2, wherein identifying the particular network component includes identifying a Session Management Function ("SMF") of the wireless network when the particular set of keywords are associated with control plane traffic.

4. The device of claim 1,
   wherein executing the processor-executable instructions to identify the one or more traffic attributes further causes the one or more processors to identify that the particular set of keywords are associated with a particular Uniform Resource Identifier ("URI") or Internet Protocol ("IP") address, and
   wherein executing the processor-executable instructions to configure the one or more network components includes configuring the one or more network components to intercept traffic associated with the particular URI or IP address.

5. The device of claim 1, wherein the traffic associated with the UE includes a set of traffic associated with a particular application, wherein the target traffic includes traffic associated with the particular application, and wherein the target traffic is less than all of the traffic included in the set of traffic associated with the particular application.

6. A method, comprising:
   maintaining correlation information indicating respective correlations between a plurality of keywords and a plurality of traffic attributes;
   receiving, by a device and from one or more requesting devices, a request to intercept target traffic, sent via a wireless network, associated with a particular user equipment ("UE"), the request including a particular set of keywords;
   identifying, based on the correlation information, a particular set of traffic attributes, of the plurality of traffic attributes, that are correlated to the particular set of keywords included in the request, wherein the particular set of traffic attributes includes a particular network slice;

selecting, by the device, one or more network components, out of a plurality of network components of the wireless network, that handle traffic that meets the particular set of traffic attributes, wherein selecting the one or more network components includes selecting one or more network components associated with the particular network slice;

configuring, by the device, the selected one or more network components associated with the particular network slice to intercept target traffic, associated with the UE, that meets the particular set of traffic attributes; and receiving, by the device and from the one or more network components, the intercepted target traffic associated with the UE, wherein the intercepted target traffic has been intercepted by the one or more network components based on the particular set of traffic attributes, the intercepted target traffic being a subset of traffic associated with the UE.

7. The method of claim 6,
wherein identifying the one or more traffic attributes further includes identifying whether the particular set of keywords are associated with control plane traffic or with user plane traffic, and
wherein selecting the one or more network components includes:
selecting a first network component that handles control plane traffic when the particular set of keywords are associated with control plane traffic, and
selecting a second network component that handles user plane traffic when the particular set of keywords are associated with user plane traffic.

8. The method of claim 7, wherein identifying the particular network component includes identifying a Session Management Function ("SMF") of the wireless network when the particular set of keywords are associated with control plane traffic.

9. The method of claim 6,
wherein identifying the one or more traffic attributes further includes identifying that the particular set of keywords are associated with a particular Uniform Resource Identifier ("URI") or Internet Protocol ("IP") address, and
wherein configuring the one or more network components includes configuring the one or more network components to intercept traffic associated with the particular URI or IP address.

10. The method of claim 6, wherein the traffic associated with the UE includes a set of traffic associated with a particular application,
wherein the target traffic includes traffic associated with the particular application, and wherein the target traffic is less than all of the traffic included in the set of traffic associated with the particular application.

11. A non-transitory computer-readable medium, storing a plurality of processor-executable instructions, which, when executed by one or more processors, causes the one or more processors to:
maintain correlation information indicating respective correlations between a plurality of keywords and a plurality of traffic attributes;
receive, from one or more requesting devices, a request to intercept target traffic, sent via a wireless network, associated with a particular user equipment ("UE"), the request including a particular set of keywords;
identify, based on the correlation information, a particular set of traffic attributes, of the plurality of traffic attributes, that are correlated to the particular set of keywords included in the request, wherein the particular set of traffic attributes includes a particular network slice;
select one or more network components, out of plurality of network components of the wireless network, that handle traffic that meets the particular set of traffic attributes, wherein selecting the one or more network components includes selecting one or more network components associated with the particular network slice;
configure the selected one or more network components associated with the particular network slice to intercept target traffic, associated with the UE, that meets the particular set of traffic attributes; and
receive, from the one or more network components, the intercepted target traffic associated with the UE, wherein the intercepted target traffic has been intercepted by the one or more network components based on the particular set of traffic attributes, the intercepted target traffic being a subset of traffic associated with the UE.

12. The non-transitory computer-readable medium of claim 11,
wherein the processor-executable instructions, to identify the one or more traffic attributes, further include processor-executable instructions to identify whether the particular set of keywords are associated with control plane traffic or with user plane traffic, and
wherein the processor-executable instructions, to select the one or more network components, further include processor-executable instructions to:
select a first network component that handles control plane traffic when the particular set of keywords are associated with control plane traffic, and
select a second network component that handles user plane traffic when the particular set of keywords are associated with user plane traffic.

13. The non-transitory computer-readable medium of claim 12, wherein identifying the particular network component includes identifying a Session Management Function ("SMF") of the wireless network when the particular set of keywords are associated with control plane traffic.

14. The non-transitory computer-readable medium of claim 11,
wherein the processor-executable instructions, to identify the one or more traffic attributes, further include processor-executable instructions to identify that the particular set of keywords are associated with a particular Identifier ("URI") or Internet Protocol ("IP") address, and
wherein the processor-executable instructions, to configure the one or more network components, further include processor-executable instructions to configure the one or more network components to intercept traffic associated with the particular URI or IP address.

15. The non-transitory computer-readable medium of claim 11, wherein the correlation information indicates a correlation between one or more keywords of the particular set of keywords and a network slice identifier associated with the particular network slice.

16. The non-transitory computer-readable medium of claim 12, wherein identifying the particular network component includes identifying a User Plane Function ("UPF") of the wireless network when the particular set of keywords are associated with user plane traffic.

17. The device of claim 1, wherein the correlation information indicates a correlation between one or more keywords of the particular set of keywords and a network slice identifier associated with the particular network slice.

18. The device of claim 2, wherein identifying the particular network component includes identifying a User Plane Function ("UPF") of the wireless network when the particular set of keywords are associated with user plane traffic.

19. The method of claim 6, wherein the correlation information indicates a correlation between one or more keywords of the particular set of keywords and a network slice identifier associated with the particular network slice.

* * * * *